(12) United States Patent
Linhart et al.

(10) Patent No.: US 7,713,324 B2
(45) Date of Patent: May 11, 2010

(54) FILTER

(75) Inventors: Jochen Linhart, Schwaikheim (DE); Andreas Franz, Ludwigsburg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 577 days.

(21) Appl. No.: 11/640,997

(22) Filed: Dec. 19, 2006

(65) Prior Publication Data

US 2007/0137157 A1 Jun. 21, 2007

(30) Foreign Application Priority Data

Dec. 19, 2005 (DE) .................. 20 2005 019 910 U

(51) Int. Cl.
*B01D 39/06* (2006.01)
*B01D 24/00* (2006.01)
*B01D 39/14* (2006.01)
*B01D 50/00* (2006.01)
*F01N 3/10* (2006.01)
*F01N 3/08* (2006.01)
*B01J 23/00* (2006.01)
*F01N 3/00* (2006.01)

(52) U.S. Cl. ............................. 55/523; 55/522; 55/524; 422/172; 422/173; 422/174; 422/175; 422/176; 422/177; 422/178; 422/179; 422/180; 502/303; 60/297

(58) Field of Classification Search ............ 55/522–524; 422/172–180; 502/303; 60/297

See application file for complete search history.

(56) References Cited

U.S. PATENT DOCUMENTS

| 2,104,473 | A | * | 1/1938 | Watson | .................. 210/486 |
| 3,346,121 | A |   | 10/1967 | Bally | |
| 5,094,073 | A | * | 3/1992 | Worner et al. | .................. 60/299 |
| 5,322,537 | A | * | 6/1994 | Nakamura et al. | .......... 55/523 |
| 5,480,621 | A | * | 1/1996 | Breuer et al. | .............. 422/174 |
| 5,714,025 | A | * | 2/1998 | Brungardt | ................ 156/89.11 |
| 5,902,364 | A | * | 5/1999 | Tokar et al. | .................. 55/498 |
| 6,444,006 | B1 | * | 9/2002 | Haberkamp et al. | .......... 55/521 |
| 7,128,772 | B2 | * | 10/2006 | Brück | ................... 55/385.3 |
| 7,306,717 | B2 | * | 12/2007 | Tezuka et al. | ............. 210/151 |
| 2002/0096247 | A1 |   | 7/2002 | Wydeven | |
| 2004/0187456 | A1 | * | 9/2004 | Bruck | ...................... 55/487 |
| 2006/0163150 | A1 | * | 7/2006 | Golden et al. | ............ 210/493.1 |
| 2007/0084786 | A1 | * | 4/2007 | Smithies | .................... 210/490 |
| 2007/0089828 | A1 |   | 4/2007 | Treier et al. | |
| 2008/0184686 | A1 | * | 8/2008 | Pope et al. | ................... 55/521 |

FOREIGN PATENT DOCUMENTS

DE 203 10 495 U1 11/2003
WO WO2004007054 * 1/2004

OTHER PUBLICATIONS

European Search Report dated Mar. 15, 2007 with English translation of relevant portion (Seven (7) pages).

* cited by examiner

*Primary Examiner*—Walter D Griffin
*Assistant Examiner*—Amber Orlando

(57) ABSTRACT

A filter composed of a filter medium (10) formed from a corrugated filter layer (11) and a flat filter sheet (12) which are interconnected by embossing points (15). This eliminates the need for an additional joining agent. Production of the filter is simplified because no additional materials are required to be supplied or cured.

12 Claims, 4 Drawing Sheets

FILTER

BACKGROUND OF THE INVENTION

The invention relates to a filter comprising a spirally wound filter medium formed from a corrugated filter layer and a flat filter sheet for separating particles from a fluid stream. In a preferred aspect the invention relates to a diesel particle filter for separating particles from the exhaust stream of an internal combustion engine.

Filters having a spirally wound filter medium are known in the art. The filter medium is formed from a corrugated filter layer and a flat filter sheet. The corrugated filter layer has corrugation valleys and peaks. To connect the filter layer to the filter sheet, the corrugation valleys are glued to the filter sheet. Thus, channels are formed between the corrugation peaks and the filter sheet. As the filter medium is wound, channels are also formed between the corrugation valleys and the filter sheet wound on top of them. The end faces of the channels are alternately closed, so that the fluid to be cleaned can flow into a channel, flow through the filter sheet or the filter layer and flow out of the filter through the adjacent channel. Adhesive is used to connect the corrugated filter layer to the filter sheet and close the end faces of the channels. When the corrugation valleys are connected to the filter sheet, the filtering surface is blocked by the adhesive applied. To alternately close the channels, adhesive is applied between the filter sheet and the filter layer. This adhesive fills the volume formed between the corrugation peaks and the filter sheet, which requires a large amount of adhesive.

SUMMARY OF THE INVENTION

It is accordingly an object of the invention to provide an improved spirally wound filter.

Another object of the invention is to provide a spirally wound filter which can be produced cost-effectively.

A further object of the invention is to provide a spirally wound filter in which the filtering surface is not reduced by adhesive used for assembly.

These and other objects are achieved in accordance with the present invention by providing a filter comprising a spirally wound filter medium formed of a corrugated filter layer having valleys and peaks and a flat filter sheet, wherein the valleys of the corrugated filter layer are connected to the flat filter sheet by a form-fit connection, and alternately closed channels are formed between the peaks and the filter sheet.

In accordance with a further aspect of the invention, the objects are achieved by providing a filter comprising a spirally wound filter medium formed of a corrugated filter layer having valleys and peaks and a flat filter sheet, wherein the valleys of the corrugated filter layer are connected to the flat filter sheet, and alternately closed channels are formed between the peaks and the filter sheet, and wherein the filter sheet and the filter layer are each formed of a weldable material and the connection between the valleys of the corrugated layer and the flat filter sheet is a welded connection.

In accordance with a still further aspect of the invention the objects are achieved by providing a diesel particle filter for an internal combustion engine, which filter comprises a sintered ceramic body with channel structures, the sintered ceramic body having a porosity suitable for removing solid combustion residues from an engine exhaust gas stream, and the ceramic body being formed by impregnating a filter structure as described above with a fluid ceramic precursor and subsequently drying or sintering the ceramic precursor to produce the ceramic body with channel structures.

The filter according to the invention can be used to separate particles from a fluid stream, particularly from gases, such as air. To this end, the filter comprises a spirally wound filter medium which is formed from a corrugated filter layer and a flat filter sheet, both of which are made of a filter material permeable to the fluid to be cleaned. Filter materials of this type include, for example, nonwovens, cellulose papers or mixtures thereof. These filter materials have sufficient dimensional stability that any corrugation impressed on them will persist even after removal of a forming die. This dimensional stability can also be achieved by a subsequent process step, such as curing or coating, for example. The corrugated filter layer has valleys and peaks, and the valleys of the corrugated filter layer are connected to the flat filter sheet. Channels are formed between the peaks and the filter sheet, and the channels are closed at their end faces. As the filter medium is wound, the peaks of the corrugated filter layer contact the underside of the filter sheet of the subsequent layer. This causes further channels to form between the valley and the subsequent layer.

To connect the filter sheet to the filter layer, a form-fit connection is provided between the valleys and the flat filter sheet. This is achieved by a partial overlap of the filter sheet and the filter layer. This overlap can be obtained, for example, by a fold or crease, such that the two parts, because of their dimensional stability, are fixed relative to each other. This form of connection eliminates the need for an additional joining agent, so that the entire filtering surface is available for cleaning the fluid stream. It also saves the cost of adhesives. In addition, disposability is improved because the filter is a single-material component. As a result, the filter can be simply incinerated without creating residues of other substances.

In one advantageous embodiment of the invention, the closure of the channels at the end face area is produced by a form-fit connection, such that the peaks are pressed onto the filter sheet. Pressing the peaks onto the filter sheet substantially reduces the volume to be closed. Furthermore, the peaks are connected to themselves and to the filter sheet by turned-over folds or creases. As a result, no additional material is required to close the channels, which saves cost of material. In addition, the production cycle is shortened because no curing times for adhesives or other components are required. By pressing the peaks onto the filter sheet, the flow into the channels is improved because the flow resistance of the closed channels is reduced.

It is advantageous to produce the form-fit connection by embossing the filter sheet or filter layer such that indentations in the sheet or layer engage indentations in the other member, i.e., the layer or sheet. These indentations may be formed as round, oval or angular embossing points, such that both filter strata (filter sheet and filter layer) are simultaneously in contact with the embossing die. The upper filter strata, which contacts one die, is pressed into the lower filter strata, which is supported on a bottom die. The two filter strata are thus embossed together in a precise fit. Embossing indentations into the filter layer and the filter sheet eliminates the need for additional folds, so that the entire installation space and the entire filter medium can be used for filtration.

To produce the form-fit connection it is advantageous to use an embossing roll. An embossing roll makes it possible to produce uniform embossing points quickly and easily. The spacing between the individual points and the configuration of the embossing points are regular. This creates a uniform connection across the entire filter medium.

In an alternative embodiment of the filter according to the invention, a filter medium is wound in spiral form, as already described above. The filter medium comprises a corrugated filter layer and a flat filter sheet, and the filter medium is weldable. Both a polyester nonwoven and cellulose paper with synthetic fibers are suitable for this purpose. The proportion of synthetic fibers must be selected in such a way that the cellulose paper can be thermally bonded. Preferably, both filter strata are formed of the same material. It is also possible, however, to weld different materials together.

In yet another embodiment of the filter according to the invention, the one filter stratum is formed of a weldable medium and the other filter stratum of a non-weldable medium. To connect the two strata, the weldable medium is melted and penetrates the non-weldable medium to produce the bond. With regard to the dimensional stability of the filter medium, the filter strata formed by the filter sheet and the filter layer are stable enough so that the applied corrugation is permanent. The corrugated filter layer has valleys and peaks, such that the valleys of the corrugated filter layer are connected to the flat filter sheet by a weld. The channels formed between the peaks and the filter sheet are closed at one of the end faces. The other end face remains open. The channels formed between the valleys and the underside of the adjacent filter sheet by winding the filter medium are closed on the opposite side, so that alternately closed channels are formed. No additional materials are introduced into the filter medium by the welded connection, so that the filter medium in the filter is a single-component material. This facilities disposal of the used filter after filter replacement.

In accordance with another embodiment of the invention, the closure of the channels in the end face area is produced by a weld, such that the peaks are pressed onto the filter sheet. Pressing the peaks onto the filter sheet substantially reduces the volume to be closed off. Furthermore, the peaks are welded to themselves and to the filter sheet. As a result, no additional material is required to close the channels, which saves cost of materials. In addition, the production cycle is shortened because no curing times for adhesives or other components are required. By pressing the peaks onto the filter sheet, the flow into the channels is improved because the flow resistance of the closed channels is reduced.

In one advantageous embodiment of the invention, the welded joint is produced by ultrasound. A sonotrode is used for this purpose, and the filter sheet and the filter layer are jointly guided past the sonotrode. After welding, the filter medium can be wound and subsequently cut to length as required. An ultrasonically welded joint is easy to produce and can be produced even in small components.

The diesel particle filter according to the invention is intended particularly for motor vehicles and comprises a sintered ceramic body with channel structures. A filter such as the one described above is used to produce the sintered ceramic body. The filter has alternately closed channels. This closure and the connection of the filter layer to the filter sheet are produced without adding any additional components.

In another embodiment of the filter, the channels are not alternately closed. Thus the filter medium has identical particle collection properties in all the areas. This means that the filter can be impregnated with a ceramic mass and the ceramic mass settles uniformly within the entire filter. The filter merely forms the support structure for the ceramic mass. In a subsequent drying or sintering process, the filter medium is combusted and removed from the ceramic mass. The porosity of the sintered ceramic body can be influenced by the porosity and structure of the filter medium, particularly paper. The sintered ceramic body furthermore has the same geometry as the filter. Thus, the channels of the channel structure are also alternately closed or open. In a filter with open channels, the alternate channel closure is produced by the ceramic mass. The exhaust gas streaming in at one end face flows into the channels that are open on this side. Since the channels on the opposite side are closed, the exhaust gas must pass through the porous wall of the channels. The diesel particles are thereby retained and the cleaned exhaust gas can exit the sintered ceramic body through the adjacent channels. Since the filter is produced without using additional joining agent, the ceramic mass homogenously penetrates the filter, so that all the adjacent filter strata have good contact with each other. The formation of defects is prevented, so that the sintered ceramic body has good shatter resistance and can withstand shocks, such as may occur in motor vehicles, without being destroyed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
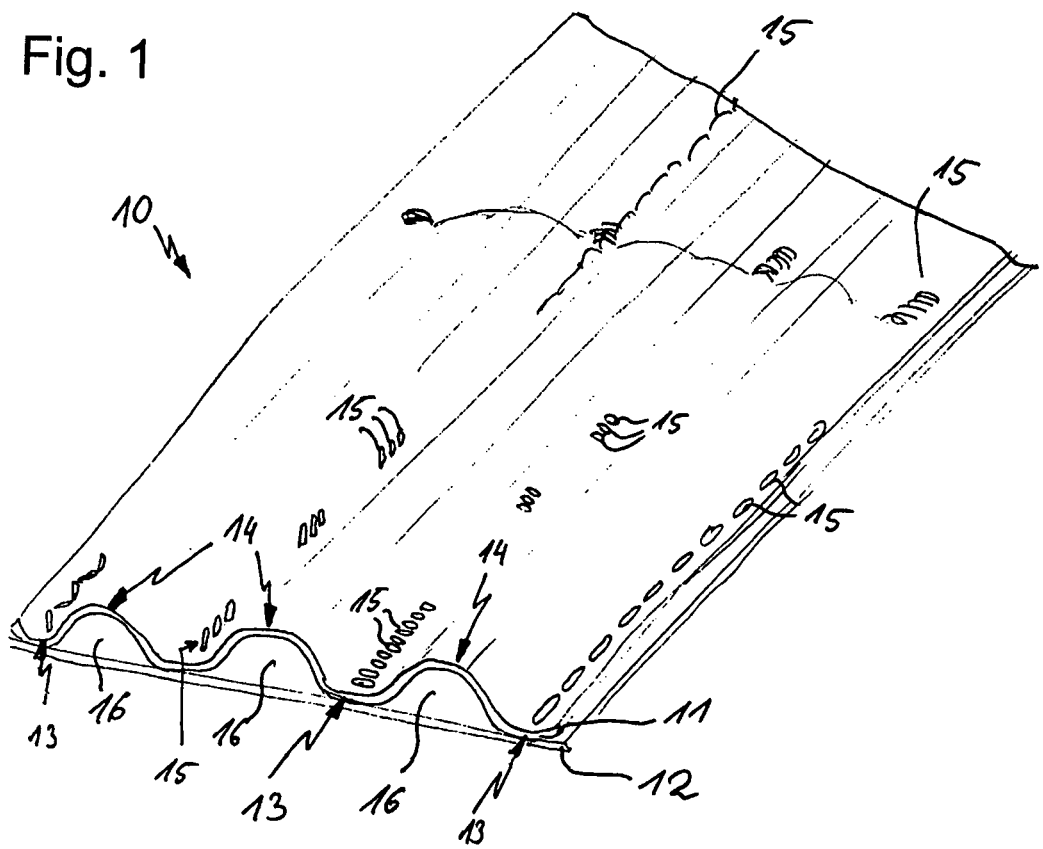
FIG. 1 is a detail view of a filter medium according to the invention.

FIG. 1 is a detail perspective view of a filter medium 10, which depicts a partial manufacturing step. The filter medium 10 shown in this view will be further processed in a subsequent step. The filter medium 10 comprises a corrugated filter layer 11 and a flat filter sheet 12. Both filter strata 11, 12 are formed of the same dimensionally stable cellulose paper. The corrugated filter layer 11 has valleys 13 and peaks 14. The valleys 13 are connected to the flat filter sheet 12 by embossing points 15, so that the filter layer 11 is fixed to the filter sheet 12. The embossing points 15 are disposed in a line only in partial areas along the valley floor, which is the lowest point of the valley 13. Between the peaks 14 and the filter sheet 12, parallel-extending channels 16 are formed. Since the embossing points 15 do not form a sealing connection between the filter strata 11, 12, volume flows are able to pass from one channel 16 to the next channel 16 extending parallel thereto. A leakage flow from one channel 16 to another channel 16 is unimportant because the parallel channels 16 carry the same unfiltered or filtered fluid.

Figure 2:
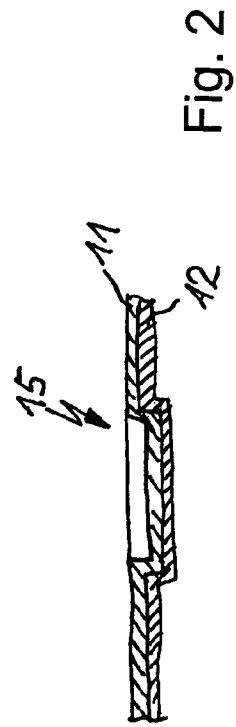
FIG. 2 is a cross-sectional view of an embossing point.

FIG. 2 shows the embossing point 15 in cross-section. The embossing point 15 forms a positive-locking connection between the corrugated filter layer 11 and the filter sheet 12. Both filter strata 11, 12 are deformed in such a way that the indentations are permanent and remain even after removal of the strata from the embossing dies. The indentation in the flat filter sheet 12 forms the seat for the indentation of the filter layer 11. Since the two filter strata 11, 12 interengage, the holding forces are sufficient to prevent accidental detachment of the filter strata 11, 12 from each other.

Figure 3:
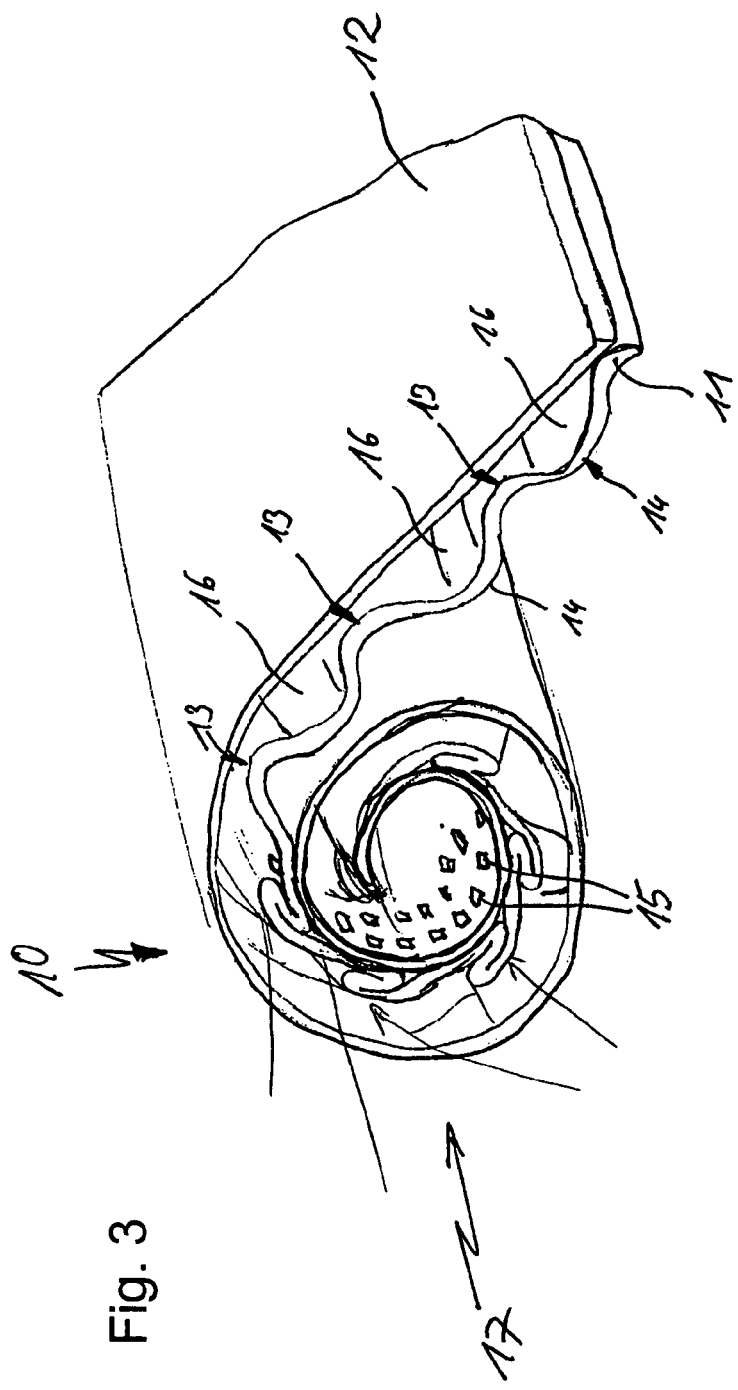
FIG. 3 illustrates a filter medium during winding.

FIG. 3 shows the filter medium 10 depicted in FIG. 1 during winding. Components corresponding to those of FIGS. 1 and 2 are identified by the same reference numerals. The filter strata 11, 12, which are joined as illustrated in FIG. 1, are rolled up to form a winding 17. In this process, the channels 16 are closed along their end faces. To this end, the peaks 14 are pressed onto the filter sheet 12 and fixed with embossing points 15. Outside the pressed areas at the end faces the channels 16 remain. On the opposite end face, the channels 16 have their corrugated shape. The process of closing the channels 16 will be described below with reference to FIG. 4.

Figure 4:
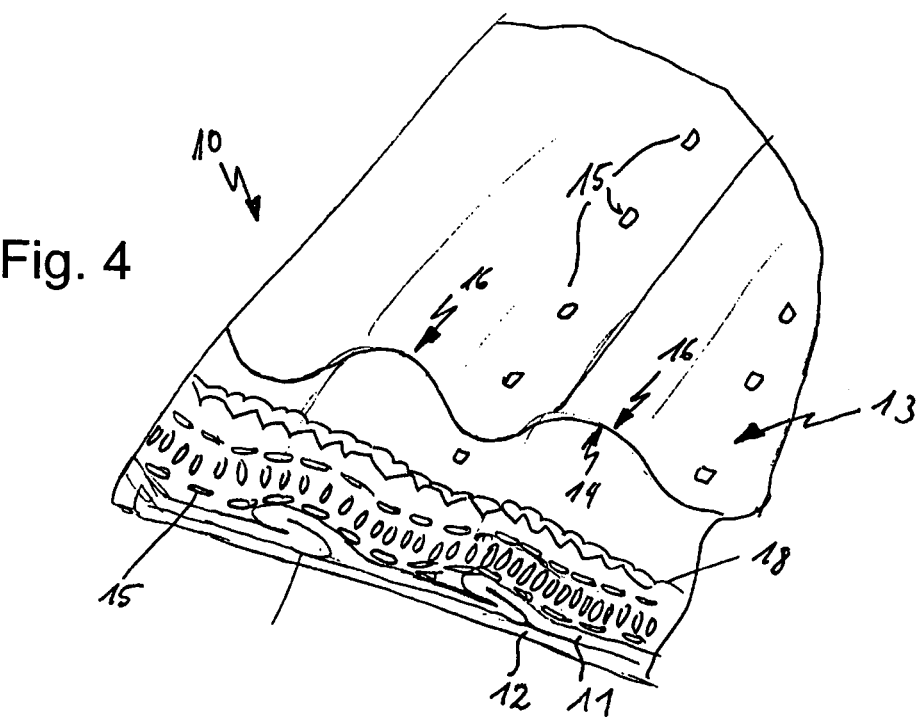
FIG. 4 is a detail view of a filter medium of the invention with closed end faces.

FIG. 4 shows a detail view of the filter medium 10 with closed channels 16. Again, components corresponding to those depicted in FIGS. 1 and 3 are identified by the same reference numerals. The end faces of the channels 16 are closed by pressing or crimping the peaks 14. Pressing causes the peaks 14 to form folds, such that the accumulation of material is fixed by the embossing points 15. This creates a connection to the filter layer 11 itself as well as to the filter sheet 12. To secure the connection, a plurality of embossing rows 18 is provided, which extend parallel to each other.

Figure 5:
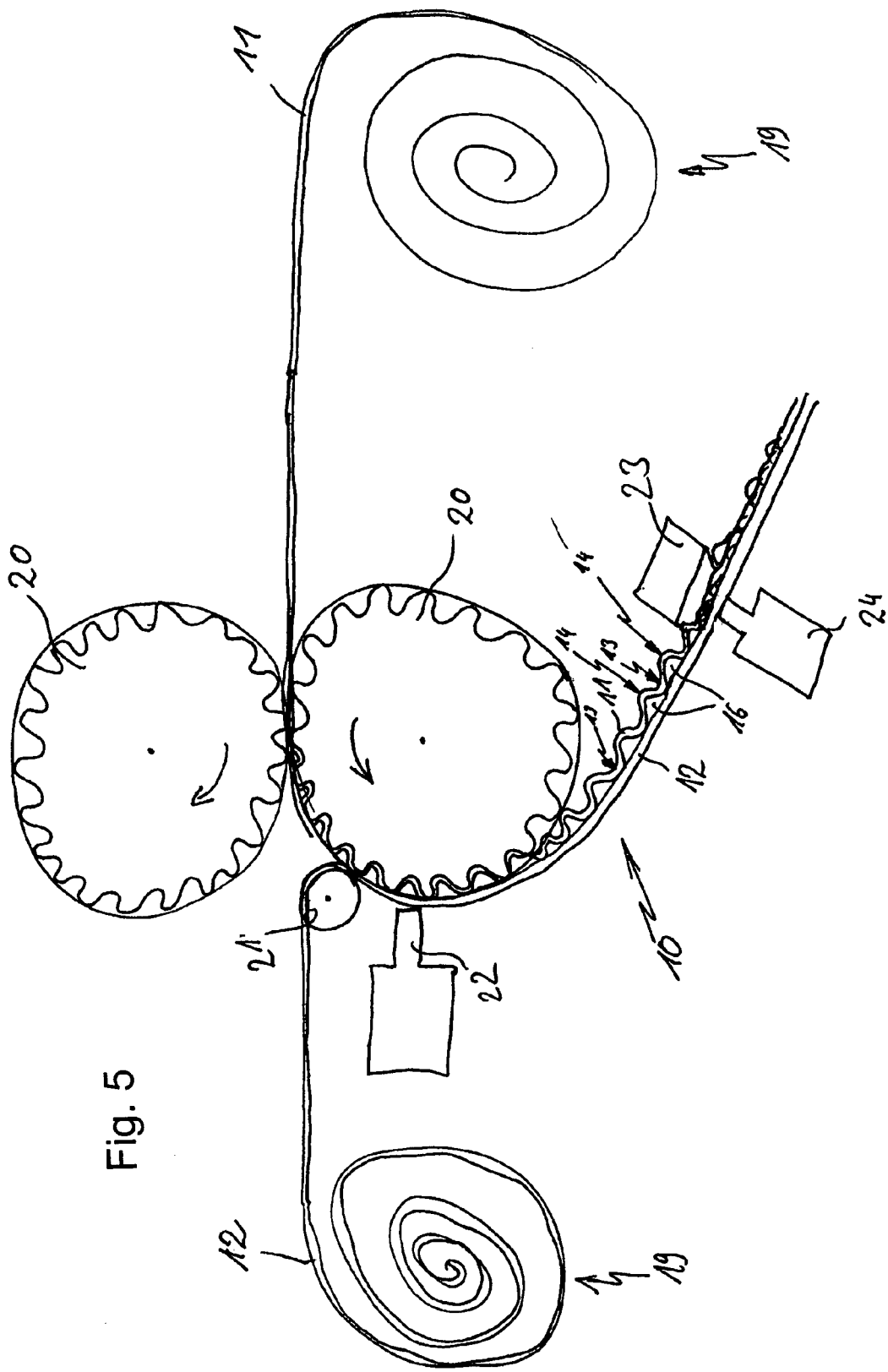
FIG. 5 illustrates the process of welding the filter medium.

FIG. 5 illustrates a process sequence for welding the filter medium 10. The filter strata 11, 12 to be connected are each unwound from an endless roll 19. Both filter strata 11 and 12 are formed of the same weldable material. The material for the corrugated filter layer 11 is guided over profiled rolls 20, which produce the required corrugation. After the filter layer 11 has been corrugated, the filter sheet 12 is fed over a guide pulley 21 and is pressed onto the corrugated filter layer 11. The corrugated filter layer 11 continues to be guided in the profiled roll 20 to prevent damage to the corrugated shape. The strata 11, 12 thus brought together are welded to the filter sheet 12 in the contact zones of the valleys 13 using a sonotrode 22. The closing of the end faces of the channels 16 can be effected by expanding the production plant or by using another machine in a subsequent process. To close the channels 16, they are pressed by an anvil 23 at their end face and are welded by an additional sonotrode 24. Outside the pressed-down end faces the channels 16 remain.

Figure 6:
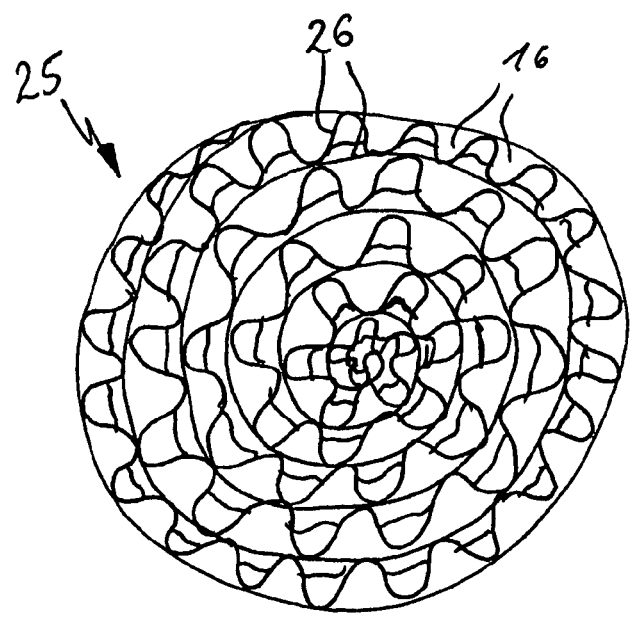
FIG. 6 is a top view of a diesel particle filter.
Figure 7:
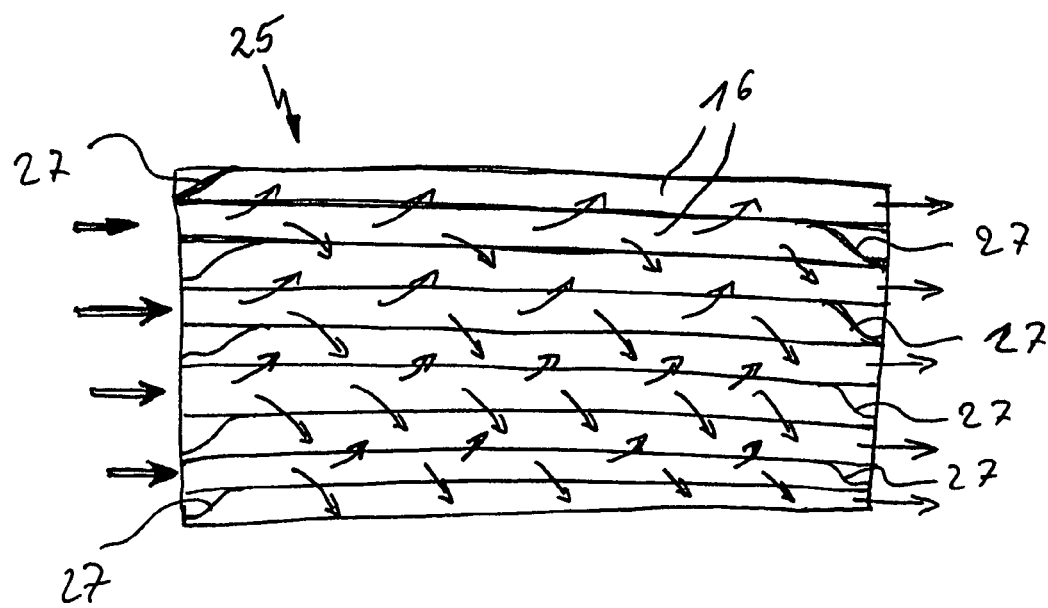
FIG. 7 is a longitudinal section of a diesel particle filter.

FIG. 6 shows a top view of a diesel particle filter according to the invention. The diesel particle filter comprises a sintered ceramic body 25, which has porous walls 26 that are permeable to the internal combustion engine exhaust gas which is to be cleaned by the filter. The walls 26, as shown in FIG. 7, form alternately closed channels 16 that extend parallel to each other. The channels 16 that are open in the left half of the figure are closed at the opposite end face (right half of the figure). The closure 27 of the, channels 16 is indicated schematically. The channels 16 that are closed on the left end face are open on the opposite end face (right end face), so that the gas to be cleaned flows through the sintered ceramic body 25 in the direction of the arrows, as shown.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter comprising a spirally wound filter medium formed of a corrugated filter layer having valleys and peaks and a flat filter sheet, wherein the valleys of the corrugated filter layer are connected to the flat filter sheet by a form-fit connection, and alternately closed channels are formed between the peaks and the filter sheet; wherein said alternately closed channels are closed by pressing said peaks of said corrugated layer against said flat sheet to form folds, accumulated material of said folds fixed together by embossing.

2. A filter according to claim 1, wherein the peaks of the corrugated layer are pressed onto the filter sheet to produce a form-fit connection which closes resulting channels adjacent an end face of the filter.

3. A filter according to claim 1, wherein the form-fit connection is produced by embossing the filter layer and filter sheet together such that indentations in the filter sheet or filter layer engage mating indentations in the filter layer or filter sheet, respectively.

4. A filter according to claim 1, wherein the form-fit connection is produced by embossing the filter layer and filter sheet together with an embossing roll.

5. A diesel particle filter for an internal combustion engine, wherein a spirally wound filter body is formed comprising a spirally wound filter medium formed of a corrugated filter layer having valleys and peaks and a flat filter sheet, wherein the valleys of the corrugated filter layer are connected to the flat filter sheet by a form-fit connection and alternately closed channels are formed between the peaks and the filter sheet; wherein the fully formed spirally wound filter body is then impregnated with a fluid ceramic precursor and subsequently dryed or sintered to produce a sintered ceramic body with channel structures; said sintered ceramic body having a porosity suitable for removing solid combustion residues from an engine exhaust gas stream.

6. A diesel particle filter according to claim 5, wherein the corrugated filter layer and flat filter sheet are removed by combustion during the drying or sintering.

7. A diesel particle filter according to claim 5, wherein the porosity of the dried or sintered ceramic body is determined by the porosity and structure of the impregnated filter structure.

8. A filter comprising a spirally wound filter medium formed of a corrugated filter layer having valleys and peaks and a flat filter sheet, wherein the valleys of the corrugated filter layer are connected to the flat filter sheet, and alternately closed channels are formed between the peaks and the filter sheet, and wherein the filter sheet and the filter layer are each formed of a weldable material and the connection between the valleys of the corrugated layer and the flat filter sheet is a welded connection; wherein said alternately closed channels are closed by pressing said peaks of said corrugated layer against said flat sheet to form folds, accumulated material of said folds fixed together by embossing.

9. A filter according to claim 8, wherein the welded connection is produced by ultrasonic welding.

10. A diesel particle filter for an internal combustion engine, said filter comprising a sintered ceramic body with channel structures; said sintered ceramic body having a porosity suitable for removing solid combustion residues from an engine exhaust gas stream; wherein said ceramic body is formed by impregnating a filter structure according to claim 8 with a fluid ceramic precursor and subsequently drying or sintering the ceramic precursor to produce said ceramic body with channel structures.

11. A diesel particle filter according to claim 10, wherein the corrugated filter layer and flat filter sheet are removed by combustion during the drying or sintering.

12. A diesel particle filter according to claim 10, wherein the porosity of the dried or sintered ceramic body is determined by the porosity and structure of the impregnated filter structure.

* * * * *